US012204472B2

(12) United States Patent
Kuo

(10) Patent No.: US 12,204,472 B2
(45) Date of Patent: Jan. 21, 2025

(54) DATA STORAGE DEVICE WITH SYSTEM OPERATION CAPABILITY

(71) Applicant: INNODISK CORPORATION, New Taipei (TW)

(72) Inventor: Chin-Chung Kuo, New Taipei (TW)

(73) Assignee: INNODISK CORPORATION, New Taipei (TW)

( * ) Notice: Subject to any disclaimer, the term of this patent is extended or adjusted under 35 U.S.C. 154(b) by 0 days.

(21) Appl. No.: 17/381,391

(22) Filed: Jul. 21, 2021

(65) Prior Publication Data

US 2022/0092005 A1 Mar. 24, 2022

(30) Foreign Application Priority Data

Sep. 21, 2020 (TW) ................................. 109132598

(51) Int. Cl.
| | |
|---|---|
| *G06F 13/16* | (2006.01) |
| *G06F 1/26* | (2006.01) |
| *G06F 13/40* | (2006.01) |
| *G06F 13/42* | (2006.01) |
| *H04L 12/10* | (2006.01) |

(52) U.S. Cl.
CPC ...... *G06F 13/1668* (2013.01); *G06F 13/4022* (2013.01); *G06F 13/4282* (2013.01); *H04L 12/10* (2013.01); *G06F 1/26* (2013.01); *G06F 2213/0026* (2013.01); *G06F 2213/0032* (2013.01)

(58) Field of Classification Search
CPC .... G06F 13/4081; G06F 1/187; G06F 1/3221; G06F 13/28; G06F 13/4221; G06F 2213/0026; G06F 2213/0036
See application file for complete search history.

(56) References Cited

U.S. PATENT DOCUMENTS

| | | | | |
|---|---|---|---|---|
| 8,667,192 | B2* | 3/2014 | Allaire | G06F 15/7867 |
| | | | | 710/200 |
| 9,495,245 | B2* | 11/2016 | Peddle | G06F 13/4059 |
| 9,703,744 | B2* | 7/2017 | Tanaka | G06F 13/4221 |
| 10,349,152 | B2* | 7/2019 | Adiletta | G11C 7/1072 |
| 11,120,119 | B2* | 9/2021 | Achkir | G06F 21/57 |
| 11,349,734 | B2* | 5/2022 | Adiletta | G11C 5/02 |
| 2012/0113265 | A1* | 5/2012 | Galvin | H04N 21/2187 |
| | | | | 348/E7.085 |

(Continued)

*Primary Examiner* — Henry Tsai
*Assistant Examiner* — Christopher A Bartels

(57) ABSTRACT

A data storage device is disclosed. The data storage device comprises a data storage unit, a data transmission interface, and a microprocessor. The data transmission interface is connected to the data storage unit via a switch. The microprocessor is connected to an input and output device, and connected to the data storage unit via the switch. The microprocessor is configured with an embedded system. When a connection between the data transmission interface and the data storage unit is conducted via the switch, a host is able to read data from or write to the data storage unit via the data transmission interface. Otherwise, when a connection between the microprocessor and the data storage unit is conducted via the switch, the embedded system of the microprocessor can execute an input and output process between the input and output device and the data storage unit.

7 Claims, 4 Drawing Sheets

(56) References Cited

U.S. PATENT DOCUMENTS

| | | | | |
|---|---|---|---|---|
| 2014/0115354 | A1* | 4/2014 | Jabbaz | H04L 12/10 |
| | | | | 713/310 |
| 2015/0006666 | A1* | 1/2015 | Backholm | H04W 4/18 |
| | | | | 709/213 |
| 2015/0103179 | A1* | 4/2015 | Galvin | H04N 21/274 |
| | | | | 348/159 |
| 2015/0317272 | A1* | 11/2015 | Tanaka | G06F 13/4022 |
| | | | | 710/301 |
| 2015/0355965 | A1* | 12/2015 | Peddle | G06F 11/1048 |
| | | | | 710/308 |
| 2015/0380985 | A1* | 12/2015 | Lecourtier | G06F 1/30 |
| | | | | 713/300 |
| 2016/0154757 | A1* | 6/2016 | Li | G06F 13/4022 |
| | | | | 710/316 |
| 2017/0331577 | A1* | 11/2017 | Parkvall | H04B 7/0848 |
| 2017/0353929 | A1* | 12/2017 | Tacconi | H04W 52/42 |
| 2018/0027686 | A1* | 1/2018 | Adiletta | G08C 17/02 |
| | | | | 361/679.48 |
| 2018/0060261 | A1* | 3/2018 | Chhor | G06F 13/4282 |
| 2018/0278693 | A1* | 9/2018 | Binder | G07C 3/02 |
| 2019/0311108 | A1* | 10/2019 | Achkir | G06F 21/57 |
| 2019/0387291 | A1* | 12/2019 | Adiletta | H04L 43/0894 |
| 2020/0096550 | A1* | 3/2020 | Goergen | G01R 31/088 |
| 2020/0099896 | A1* | 3/2020 | Galvin | G01D 3/022 |
| 2020/0235949 | A1* | 7/2020 | Jones | H04B 3/54 |
| 2022/0109546 | A1* | 4/2022 | Panteleev | H04L 1/1887 |

* cited by examiner

DATA STORAGE DEVICE WITH SYSTEM OPERATION CAPABILITY

This non-provisional application claims priority claim under 35 U.S.C. § 119(a) on Taiwan Patent Application No. 109132598 filed Sep. 21, 2020, the entire contents of which are incorporated herein by reference.

FIELD OF THE INVENTION

The present invention relates to a data storage device, more particularly, a data storage device with system operation capability.

BACKGROUND

With the demand for storing data, a data storage device, such as a solid state drive (SSD), is often used by a computer host or an automated device to store important data. Please referring to FIG. 1, there is an architecture diagram of a data storage device in prior art. The data storage device 10 comprises a controller 11, a plurality of flash memories 13, and a data transmitted interface 15.

The data storage device 10 is configured in a computer host 20, and connected to a motherboard 21 of the computer host 20 via the data transmitted interface 15. The data transmitted interface 15 is a data transmitted interface conforming to SATA, PCIe, or NVMe standard protocol. When the computer host 20 wants to access data for the data storage device 10, it will send an access command (for example, read/write command) to the data transmission interface 15 of the data storage device 10. After the controller 11 of the data storage device 10 receives the access command via the data transmission interface 15, it will access data to the flash memories 13.

The conversion data storage device 10 is only used to store data, and no other functions, and its use is limited. Accordingly, the present invention provides a novel data storage device with a system operation capability, which can process data inputted and outputted by the data storage device via the system operation capability to expand the functions of the data storage device, which will be the object of the present invention.

SUMMARY

It is one objective of the present invention to provide a data storage device, in which comprises a data storage unit, a data transmission interface, a microprocessor, and an input and output interface. The data transmission interface and the microprocessor are connected to the data storage unit, respectively. The microprocessor is configured with an embedded system therein. The data storage device provides a data storage function and a system operation function. When a connection between the data storage unit and the data transmission interface is conducted via the switch, an electronic device can access data to the data storage unit via the data transmission interface. When a connection between the data storage unit and the microprocessor is conducted by the switch, the embedded system of the microprocessor is allowed to execute a specific system operation.

It is another objective of the present invention to provide a data storage device, wherein the data storage device further comprises a power port; when a power detector detects an external power source on the power port, the power detector controls the switch to conduct the connection between the microprocessor and the data storage unit so that the embedded system of the microprocessor is able to allowed to execute the specific system operation.

It is another objective of the present invention to provide a data storage device, wherein the switch is connected to a GPIO port having a trigger key. When the trigger key is pressed, a trigger signal will be generated. The trigger signal can control the switch to conduct the connection between the microprocessor and the data storage unit so that the embedded system of the microprocessor is allowed to execute the specific system.

To achieve the above objective, the present invention provides a data storage device with system operation capability, comprising: a data storage unit, comprising a controller and a plurality flash memories connected to the controller; a first data transmission interface connected to the data storage unit via a switch; and a microprocessor, connected to an input and output device via an input and output interface, connected to the data storage unit via the switch, and comprising an embedded system; wherein, when a connection between the first data transmission interface and the data storage unit is conducted via the switch, an electronic device reads data from the data storage device via the first data transmission interface, or writes data to the data storage device via the first data transmission interface; otherwise, when a connection between the microprocessor and the data storage unit is conducted via the switch, the embedded system of the microprocessor will be allowed to execute a specific system operation.

In one embodiment of the present invention, the data storage device further comprising a power port, wherein an external power source is inputted to the data storage device via the power port, a power detector is connected to the power port and the switch; when the power detector detects the external power source on the power port, the power detector controls the switch to conduct the connection between the microprocessor and the data storage unit.

In one embodiment of the present invention, wherein the power port is a powered device port of a Power over Ethernet or a DC port, and the external power source is an Ethernet power source or a DC power source.

In one embodiment of the present invention, wherein the switch comprises a first terminal, a second terminal, a common terminal, and a switch lever, the first terminal is connected to the first data transmission interface, the second terminal is connected to the microprocessor, the common terminal is connected to the data storage unit, and the switch lever is provided with one end thereof connected to the common terminal, and provided with other end thereof connected to the first terminal or the second terminal; when the common terminal is electrically connected to the first terminal via the switch lever, the connection between the data storage unit and the first data transmission interface is conducted; when the common terminal is electrically connected to the second terminal via the switch lever, the connection between the data storage unit and the microprocessor is conducted.

In one embodiment of the present invention, wherein the switch is connected to an input and output port having a trigger key, a trigger signal is generated when the trigger key is pressed, and sent to the switch, such that the trigger signal can control the switch to conduct the connection between the microprocessor and the data storage unit.

In one embodiment of the present invention, where the microprocessor is connected to the switch via a second data transmission interface; when the connection between the data storage unit and the microprocessor is conducted by the switch, the embedded system of the microprocessor reads data from the data storage unit via the second data transmission interface, or writes data into the data storage unit via the second data transmission interface.

In one embodiment of the present invention, wherein the first data transmission interface and the second data transmission interface are data transmitted interfaces conforming to SATA, PCIe, or NVMe standard protocol.

In one embodiment of the present invention, wherein the input and output interface is an input and output interface conforming to USB, GPIO, Type C, VGA, HDMI, or DVI standard protocol.

In one embodiment of the present invention, wherein the input and output device is network module, the embedded system of the microprocessor receives an operation instruction issued from a cloud platform, and executes the specific system operation according to the operation instruction.

In one embodiment of the present invention, wherein the input and output device comprises a human-machine interface device and a data output device, the embedded system of the microprocessor processes a specific document stored in the data storage unit according to an operation action of the human-machine interface device, and the processed specific document outputted by the data output device.

DETAILED DESCRIPTION OF THE PREFERRED EMBODIMENTS

Figure 1:
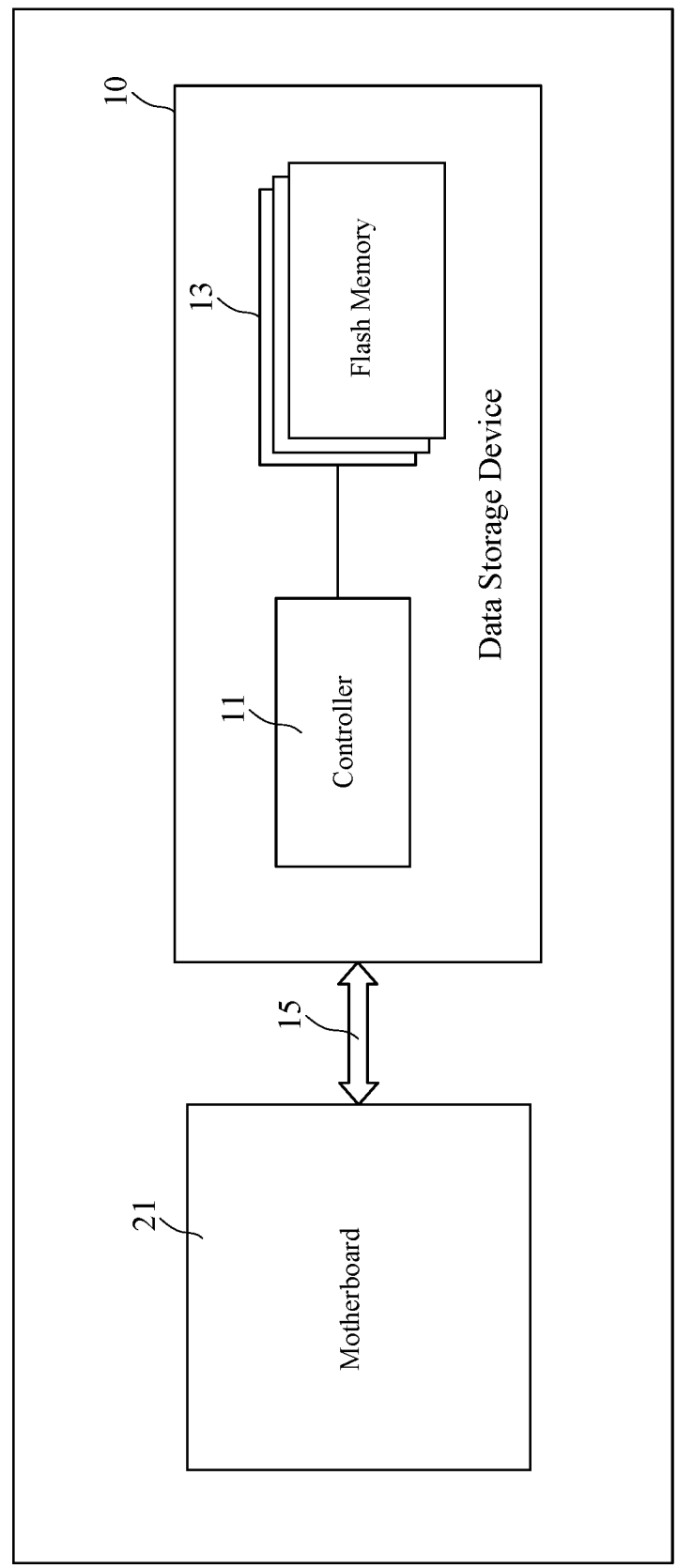
FIG. 1 is an architecture diagram of a data storage device in prior art.
Figure 2:
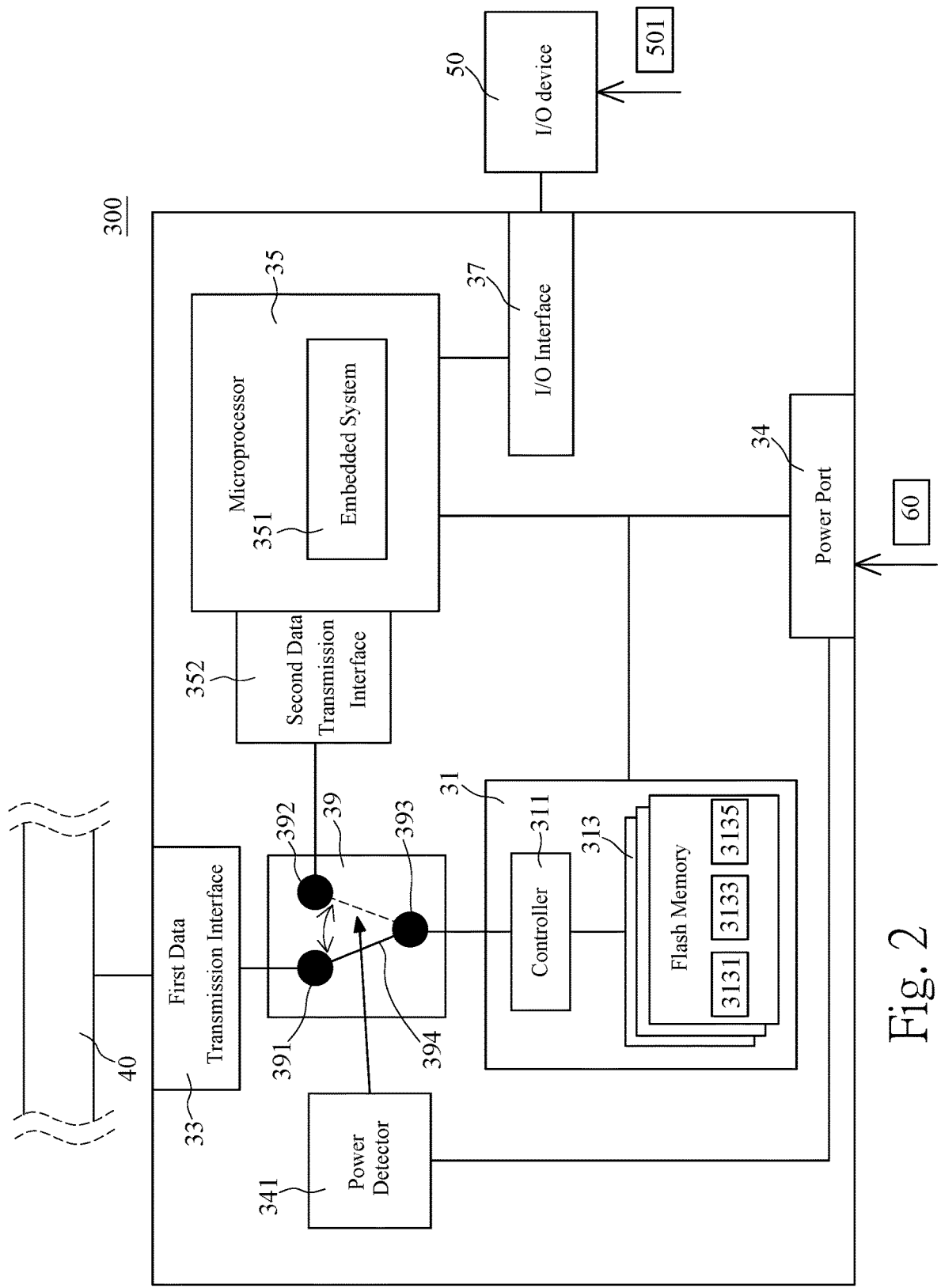
FIG. 2 is an architecture diagram of a data storage device according to one application embodiment of the present invention.

Referring to FIG. 2, there is an architecture diagram of a data storage device according to one application embodiment of the present invention. As shown in FIG. 2, the data storage device 300 can be a solid-state drive (SSD), which is configured in an electronic device, for example, a computer host or an automation device, and used as a storage medium of the electronic device. The data storage device 300 comprises a data storage unit 31, a first data transmission interface 33, a microprocessor 35, a second data transmission interface 352, and an input and output interface 37. The data storage unit 31 comprises a controller 311 and a plurality of flash memories 313. The controller 311 is connected to the flash memories 313.

The data storage device 300 is connected to a connector disposed on a motherboard of the electronic device via the first data transmission interface 33, and connected to an external input and output device 50 via the input and output interface 37. The first data transmission interface 33 and the second data transmission interface 352 are data transmitted interfaces conforming to SATA, PCIe, or NVMe standard protocol. The input and output interface 37 is an input and output interface conforming to USB, GPIO, Type C, VGA, HDMI, or DVI standard protocol.

The data storage device 300 further comprises a switch 39. The switch 39 comprises a first terminal 391, a second terminal 392, a common terminal 393, and a switch lever 394. The first terminal 391 is connected to the first data transmission interface 33. The second terminal 392 is connected to the second transmission interface 352. The common terminal 393 is connected to the data storage unit 31. The switch lever 394 is provided with one end thereof connected to the common terminal 393, and other end thereof connected to the first terminal 391 or the second terminal 392 by the switching operation. The motherboard 40 of the electronic device is connected to the switch 39 via the first data transmission interface 33, and the microprocessor 35 is connected to the switch 39 via the second transmission interface 352. Thus, it is decided that the data storage unit 31 is electrically connected to the motherboard 40 of the electronic device or the microprocessor 35 by the switching of the switch lever 394 of the switch 39.

In addition to the general data storage, the data storage device 300 of the present invention further provides a system operation function. The microprocessor 35 is configured with an embedded system 351, for example, Linux, RTOS, or TinyOS. The data storage device 300 can execute a specific system operation procedure by the embedded system 351 of the microprocessor 35.

When the data storage device 300 is to be used to store data, the common terminal 393 of the switch 39 is connected to the first terminal 391 by the switching of the switch lever 394 to conduct the connection between the data storage unit 31 and the first data transmission interface 33, such that the electronic device may read data from the data storage unit 31, or write data into the data storage unit 31. When the data storage device 300 wants to execute the system operation function, the common terminal 393 of the switch 39 is connected to the second terminal 391 by the switching of the switch lever 394 to conduct the connection between the data storage unit 31 and the microprocessor 35, such that the embedded system 351 of the microprocessor 35 executes a specific system operation between the data storage unit 31 and the input and output interface 37, and reads data requested for executing the specific system operation from the data storage unit 31, or writes data generated by executing the specific system operation to the data storage unit 31.

In one embodiment of the present invention, the system operation function of the data storage device 300 can be activated by inputting an external power source 60. The data storage device 300 comprises a power port 34. An external power source 60 can be inputted into the data storage device 300 via the power port 34. The power port 34 may be a DC port, the external power source 60 may be a DC power source provided by a power supply device, and a plug of the power supply device is inserted into the power port 34 so that the power supply device can provide the DC power source to the data storage device 300. Otherwise, the power port 34 may be a powered device port of PoE (Power over Ethernet), the external power source 60 may be an Ethernet power source provided by a PoE power supply module, the PoE power supply module is connected to the power port 34 via an Ethernet cable so that the PoE power supply module can provide the Ethernet power source to the data storage device 300. Furthermore, a power detector 341 is connected to the power port 34 and the switch 39. The power detector 341 is used to detect whether the external power source 60 exists. When the power detector 341 does not detect the external power source 60 on the power port 34, the power detector 341 controls that the common terminal 393 of the switch 39 is electrically connected to the first terminal 391 to conduct the connection between the data storage unit 31 and the first data transmission interface 33, such that the electronic device can perform general data access to the data storage unit 31 via the first data transmission interface 33. On the contrary, when the power detector 341 detects the external power source 60 on the power port 34, the power detector 341 controls that the common terminal 393 of the switch 39 is electrically connected to the second terminal 392 to conduct the connection between the data storage unit 31 and the microprocessor 35, such that the data storage device 300 can execute a specific system operation between the data storage unit 31 and the input and output interface 37 by the embedded system 351 of the microprocessor 35.

One embodiment of the present invention, a power energy required for the working of the data storage device 300 is provided by the first data transmission interface 33. The first data transmission interface 33 is an interface capable of transmitting data and power energy. For example, the first data transmission interface 33 is a SATA transmission interface, which includes a data transmission part (7 pins) and a power energy transmission part (15 pins), the data transmission part is used for transmitting data, and the power energy transmission part is used for transmitting power energy. When the data storage device 300 is inserted into the connector disposed on the motherboard 40 of the electronic device via the first data transmission interface 33, a host power source provided by the electronic device can be inputted to the data storage device 300 via the power energy transmission part of the first transmission interface 33, and thus the host power source provides the power energy required for the working of the data storage device 300.

In another embodiment of the present invention, the power energy required for the working of the data storage device 300 is provided by the external power source 60. When the first data transmission interface 33 is disconnected from the connector of the motherboard 40, the external power source 60 is inputted to the data storage device 300 via the power port 34, and thus the external power source 60 provides the power energy required for the working of the data storage device 300.

In one embodiment of the present invention, the input and output device 50 connected to the input and output interface 37 is a network module, for example, Ethernet module or WiFi module. The input and output device 50 receives an operation instruction 501, for example, operation instruction for restoring operating system, issued from a cloud platform. The flash memories 313 of the data storage unit 31 stores an operating system 3131 and a system restoring file 3133. When the system operation function of the data storage device 300 is activated, and the data storage device 300 receives the operation instruction 501 for restoring operating system via the input and output device 50, the embedded system 351 of the microprocessor 35 executes a restoring system procedure to restore the operating system 3131 according to the system restoring file 3133 in the data storage unit 31. The embedded system 351 of the microprocessor 35 reports a message indicating the completion of restoring operating system to the cloud platform via the input and output device 50 after the operating system 3131 has restored.

In another embodiment of the present invention, the operation instruction 501 issued from the cloud platform is an instruction for collecting a health information. The flash memories 313 of the data storage unit 31 stores at least one health information 3135. When the system operation function of the data storage device 300 is activated, and the data storage device 300 receives the operation instruction 501 for collecting a health information via the input and output device 50, the embedded system 351 of the microprocessor 35 executes a health information collection procedure to obtain the health information 3135 of the data storage unit 31. After the health information 3135 has collected, the embedded system 351 of the microprocessor 35 transmits the health information 3135 to the cloud platform via the input and output device 50.

The two embodiments in the above described are only partially implementation of the present invention. In actual application, the administrator of the cloud platform can issue various types of operation instructions 501, such as operation instructions for data encryption, firmware update, physical destruction, etc., to the data storage device 300, so that the embedded system 351 of the microprocessor 35 can execute the different system operations according to the operation instructions 501.

Figure 3:
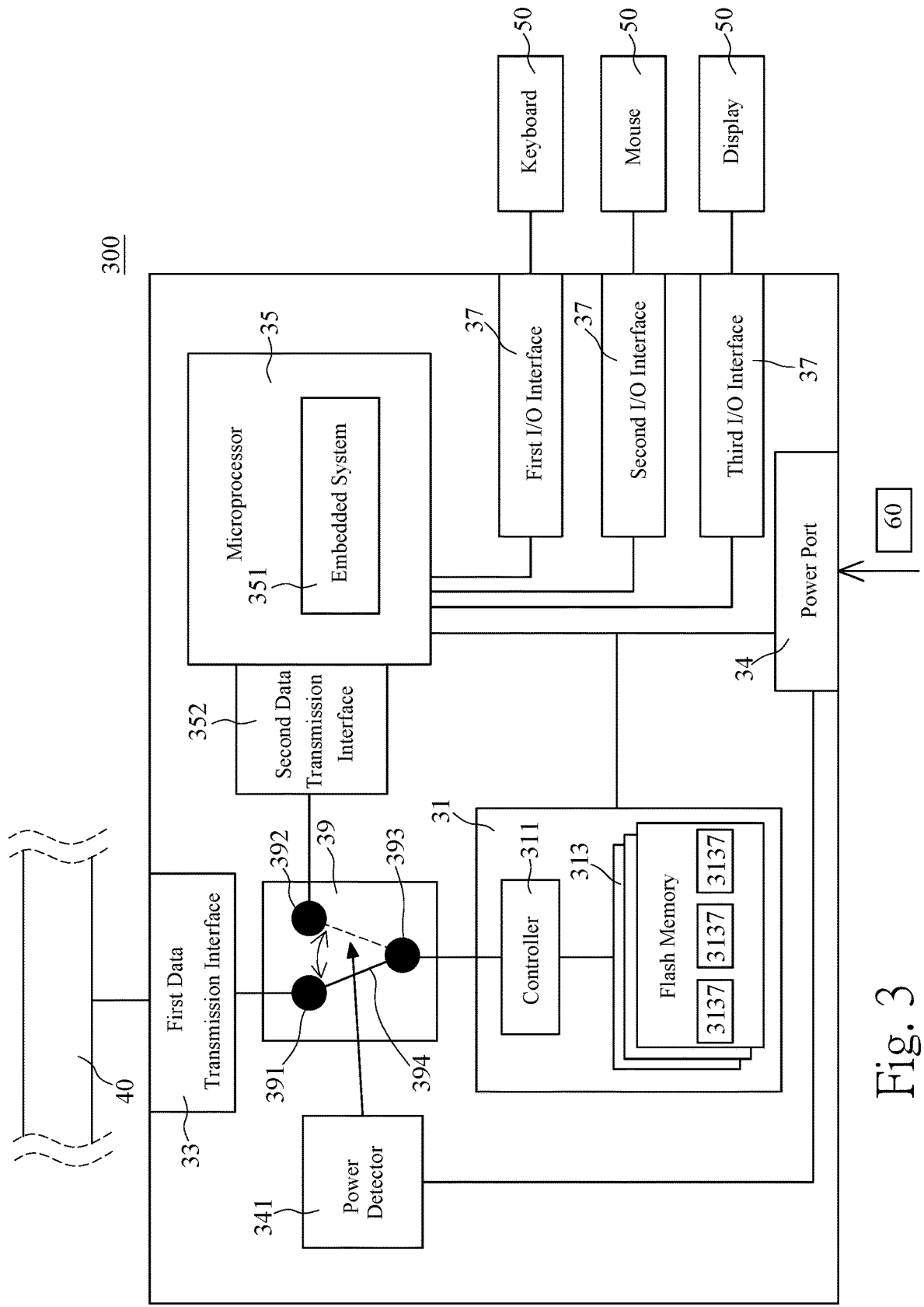
FIG. 3 is an architecture diagram of a data storage device according to another application embodiment of the present invention.

Referring to FIG. 3, there is an architecture diagram of a data storage device according to another application embodiment of the present invention. As shown in FIG. 3, the data storage device 300 of the present embodiment comprises a plurality of input and output interfaces 371, 372, and 373, for example, the first input and output interface 371, the second input and output interface 372, and the third input and output interface 373. Each of the input and output interfaces 371/372/373 is connected to a corresponding input and output device 50, respectively. The first input and output interface 371 is connected to a first human-machine interface device, for example, keyboard. The second input and output interface 372 is connected to a second human-machine interface device, for example, mouse. The third input and output interface 373 is connected to a data output device, for example, display. In the present embodiment, the flash memories 313 of the data storage unit 31 stores various formats of documents 3137, for example, WORD format documents, PDF format documents, Video format documents, and so on.

When the system operation function of the data storage device 300 has activated, the user of the data storage device 300 can select a specific file 3137 from the data storage unit 31 through an operation action of the keyboard or the mouse, and a frame outputted from the display. After the specific file 3137 is selected, the embedded system 351 of the microprocessor 35 parses the format of the specific document 3137, opens the specific document 3137 by an appropriate software program, and presents the opened specific document 3137 in the display. In one embodiment of the present invention, the software program used to open the specific file 3137 may be installed in the data storage unit 31.

In addition to be connected to the keyboard, the mouse or the display, the input and output interface of the data storage device 300 of the present invention can be also connected to a printer, a speaker or other types of input and output devices 50. Accordingly, the embedded system 351 of the microprocessor 35 can process the specific data stored in the data storage unit 31, and output the processed specific data by various input and output devices 50.

Figure 4:
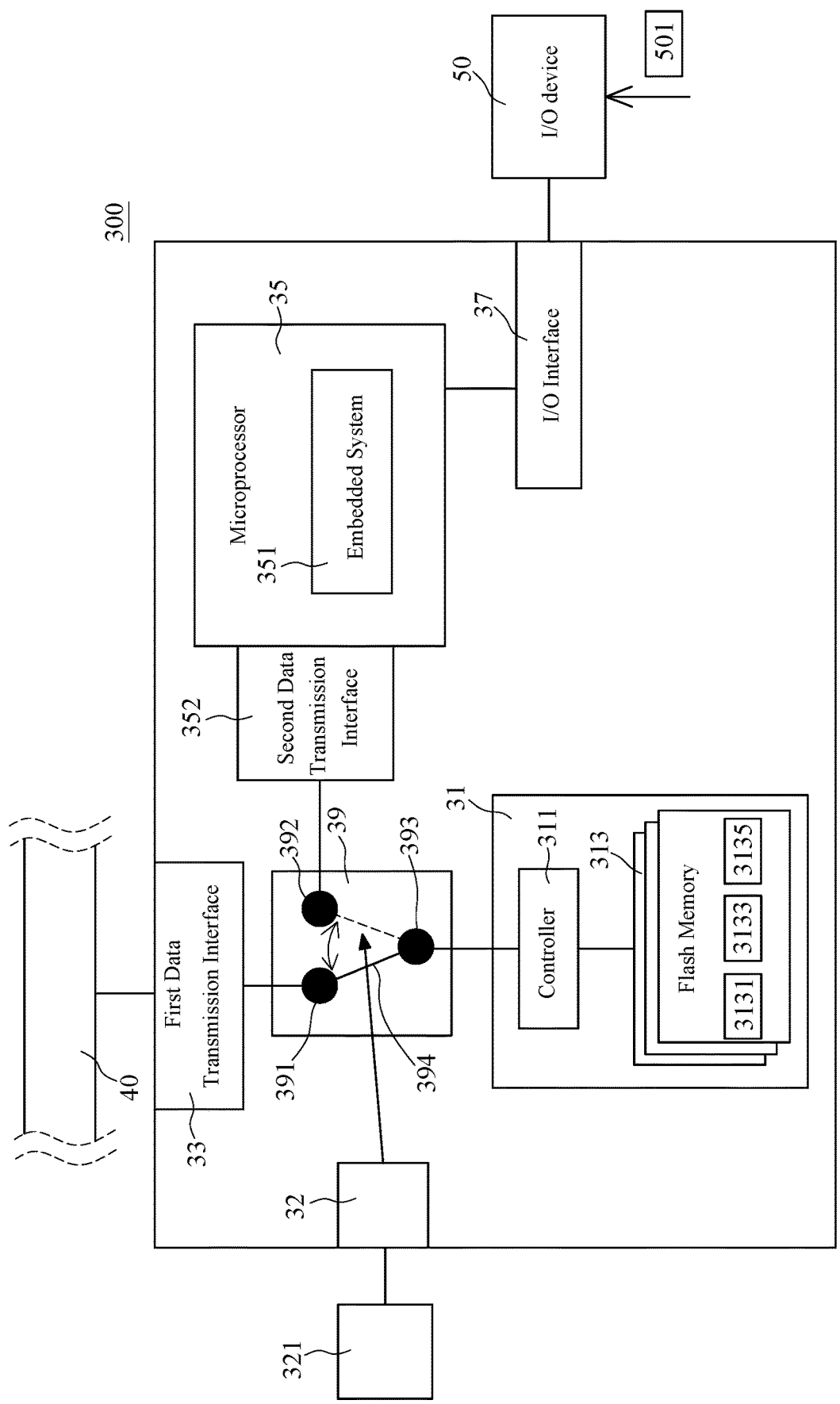
FIG. 4 is an architecture diagram of a data storage device according to another application embodiment of the present invention.

Referring to FIG. 4, there is an architecture diagram of a data storage device according to another application embodiment of the present invention. In the above embodiment in FIG. 2, it can activate the system operation function of the data storage device 300 by the input of the external power source 60. In the present embodiment in FIG. 4, it can activate the system operation function of the data storage device 300 by triggering a GPIO (General Purpose Input and Output) port. As shown in FIG. 4, the switch 39 of the present embodiment is connected to an input and output port (such as GPIO port) 32 having a trigger key 321. A trigger signal with a high level is generated when the trigger key 321 is pressed, and sent to the switch 39 via the input and output port 32. The trigger signal will be used to control the switch 39 to conduct the connection between the data storage unit 31 and the second data transmission interface 352. After the connection between the data storage unit 31 and the second data transmission interface 352 is formed, the data storage device 300 can execute the specific system operation between the data storage unit 31 and the input and output interface 37 by the embedded system 351 of the microprocessor 35.

The above disclosure is only the preferred embodiment of the present invention, and not used for limiting the scope of the present invention. All equivalent variations and modifications on the basis of shapes, structures, features and spirits described in claims of the present invention should be included in the claims of the present invention.

What is claimed is:

1. A data storage device that is a solid-state drive with a capability of self-executing system operation, comprising:
   a data storage unit, comprising a controller and a plurality of flash memories connected to the controller;
   a first data transmission interface connected to the data storage unit via a switch;
   a microprocessor, connected to an input and output device via an input and output interface, connected to the data storage unit via the switch, and comprising an embedded system, wherein the embedded system is an operating system;
   a power port; and
   a power detector connected to the power port and the switch for detecting whether an external power source is inputted to the data storage device via the power port;
   wherein the power port is a powered device port of a Power over Ethernet or a DC port;
   wherein a plug of a power supply device is inserted into the power port so that the power supply device provides the external power source to the data storage device;
   wherein the switch is a physical circuit switch element, and comprises a first terminal, a second terminal, a common terminal, and a switch lever; the first terminal is connected to the first data transmission interface, the second terminal is connected to the microprocessor, the common terminal is connected to the data storage unit, and the switch lever is provided with one end thereof connected to the common terminal, and provided with other end thereof connected to the first terminal or the second terminal;
   wherein, when the power detector does not detect the external power source on the power port, the power detector controls that the other end of the switch lever is switched to the first terminal so that the common terminal is electrically connected to the first terminal via the switch lever, a circuit connection between the first data transmission interface and the data storage unit is conducted via the switch, the data storage device activates a capability of storing data, an electronic device reads data from the data storage unit via the first data transmission interface, or writes data to the data storage unit via the first data transmission interface; otherwise, when the power detector detects the external power source on the power port, the power detector controls that the other end of the switch lever is switched to the second terminal so that the common terminal is electrically connected to the second terminal via the switch lever, a circuit connection between the microprocessor and the data storage unit is conducted via the switch, the data storage device activates the capability of system operation, the embedded system of the microprocessor will be allowed to execute a specific system operation;
   wherein the first data transmission interface is an interface capable of transmitting data and power energy to the data storage device, the first data transmission interface is a data transmitted interface conforming to a standard protocol of Serial Advanced Technology Attachment, Peripheral Component Interconnect Express, and Non-Volatile Memory Express.

2. The data storage device according to claim 1, wherein the external power source is an Ethernet power source or a DC power source.

3. The data storage device according to claim 1, wherein the switch is connected to an input and output port having a trigger key, a trigger signal is generated when the trigger key is pressed, and sent to the switch, such that the trigger signal can control the switch to conduct the connection between the microprocessor and the data storage unit.

4. The data storage device according to claim 1, where the microprocessor is connected to the switch via a second data transmission interface; when the connection between the data storage unit and the microprocessor is conducted by the switch, the embedded system of the microprocessor reads data from the data storage unit via the second data transmission interface, or writes data into the data storage unit via the second data transmission interface.

5. The data storage device according to claim 1, wherein the input and output interface is an input and output interface conforming to a standard protocol of Universal Serial Bus, General Purpose Input/Output, Type C, Video Graphics Array, High Definition Multimedia Interface, or Digital Visual Interface.

6. The data storage device according to claim 1, wherein the input and output device is network module, the embedded system of the microprocessor receives an operation instruction issued from a cloud platform, and executes the specific system operation according to the operation instruction.

7. The data storage device according to claim 1, wherein the input and output device comprises a human-machine interface device and a data output device, the embedded system of the microprocessor processes a specific document stored in the data storage unit according to an operation action of the human-machine interface device, and the processed specific document outputted by the data output device.

* * * * *